United States Patent Office 3,811,970
Patented May 21, 1974

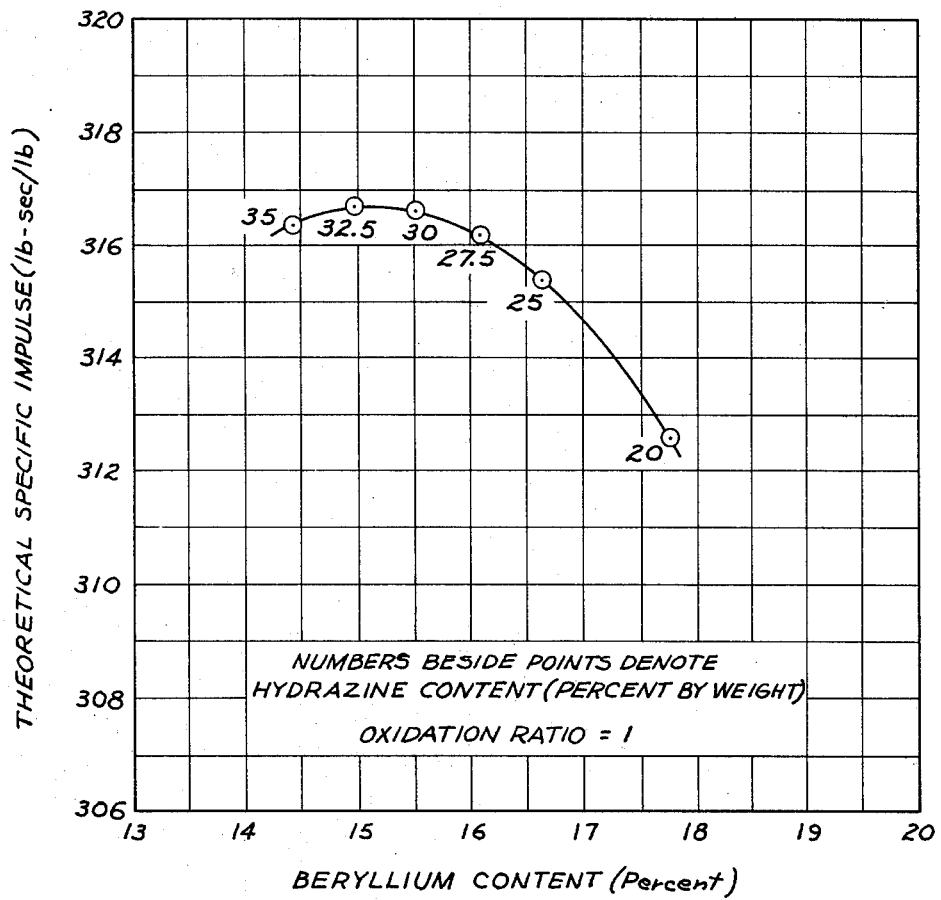

3,811,970
GELLED HYDRAZINE PROPELLANT COMPOSITIONS CONTAINING HYDRAZINE NITRATE AND A FINELY DIVIDED METAL
Charles B. Henderson, Alexandria, Va., assignor to Atlantic Research Corporation, Fairfax County, Va.
Filed Nov. 9, 1964, Ser. No. 410,022
Int. Cl. C06d 5/06, 5/10
U.S. Cl. 149—36
9 Claims This invention relates to heterogeneous, gelled propellant compositions.

It is an object of this invention to provide novel gelled propellant compositions. Another object is to provide gelled propellant compositions which burn to yield reaction products of low molecular weight, thereby producing increased propulsive performance. Still another object is to provide gelled propellants varying in consistency from low viscosity gels to solid rubbery gels. Other objects and advantages will be apparent from the drawing and the following detailed description.

Referring to the drawing, the figure is a graph wherein the theoretical specific impulse of compositions of this invention is plotted as a function of beryllium content.

The novel propellant compositions of this invention consist essentially of hydrazine, hydrazine nitrate, a gelling agent, and a finely divided solid metallic fuel. In addition the compositions may contain minor amounts of burning rate modifiers such as chromic oxide, or methoxy polyethylene glycols.

Hydrazine, gelled by the addition of the gelling agent, provides the binder for the propellant composition.

The gelling agent is selected for ability to maintain a stable gel in the presence of hydrazine nitrate. Galactomannan polysaccharides and methyl vinyl ether-maleic anhydride copolymers are examples of gelling agents which do not "salt out" to break down the hydrazine gel structure in the presence of hydrazine nitrate.

The amount of gelling agent used is an important factor governing the consistency of the propellant composition. For example, compositions containing about 1.2% by weight Jaguar A–20–B (a galactomannan polysaccharide) are strong, elastic, cohesive gels which flow easily and yet keep metallic fuel particles in suspension. By increasing the concentration of this gelling agent to about 6% or greater, a solid, rubbery gel can be obtained. Thus, by varying the amount of gelling agent, the compositions of this invention can be adapted to various uses. For example a solid, rubbery gel can be utilized as a conventional solid propellant, while less viscous compositions can be pumped, injected, or extruded into reaction chambers to provide propulsive power.

The consistency of the propellant composition is also influenced by solids content. High solids content tends to produce viscous compositions and often reduces gel strength. Hydrazine nitrate is, therefore, chosen as the oxidizer, since its solubility in hydrazine reduces the dispersed solids content of the composition.

Finely divided metallic fuels such as beryllium, aluminum, magnesium, zirconium, hafnium, alloys and hydrides of such fuels, and mixtures thereof, are included in the propellant compositions of this invention. The metallic fuel is added in an amount such that the oxidation ratio of the composition is about 0.94 to 1.50 and preferably about 0.98 to 1.15. The oxidation ratio of the composition is defined by the formula:

$$\text{Oxidation ratio} = \frac{O}{C + \left(\frac{v}{2}\right)M}$$

wherein O equal the total amount of oxygen in the propellant composition; C equals the total amount of carbon; M equals the total amount of metallic fuel calculated as free metal; and $v$ equals the valence of the metal, preferably the characteristic valence of the metal in its most stable oxide. The amounts of O, C, and M are expressed in terms of the number of gram atoms.

For an oxidation ratio of 1, there is sufficient oxygen in the composition to oxidize the carbon, which may be present in the gelling agent or burning rate modifier, to carbon monoxide and to oxidize the metallic fuel to its metal oxide. Since the oxygen reacts preferentially with the metallic fuel, it is apparent that the compositions of this invention do not contain sufficient oxygen to substantially oxidize the hydrazine. Therefore, the hydrazine, rather than being oxidized to nitrogen and water, will decompose exothermically to yield nitrogen and hydrogen when the composition is burned. The term "burned" is used, in the specification and claims, to describe decomposition as well as oxidation reactions of the propellant compositions.

The square of the specific impulse of a propellant is, approximately, directly proportional to the flame temperature and inversely proportional to the molecular weight of gaseous reaction products. Therefore, the lighter reaction products provided by the oxidation ratios specified above result in a higher specific impulse than would be obtained if sufficient oxygen were present to oxidize the hydrazine. The presence of metallic fuel also increases the flame temperature to provide a higher specific impulse.

Sufficient metallic fuel is preferably present in the composition to provide a flame temperature high enough to effect substantially complete oxidation of the metal. Otherwise, oxygen not utilized by the metal will oxidize the hydrogen of the hydrazine to form water and a lower specific impulse will be obtained. Preferably the flame temperature of the composition will be at least as high as the melting point of the metal oxide formed when the composition burns. The amount of a particular metallic fuel required to achieve a desired temperature can be readily calculated by those skilled in the art.

To obtain maximum specific impulse, there must be a balance between the metallic fuel content and hydrazine content of the composition. Increased percentages of metallic fuel produce higher flame temperatures and thus tend to increase specific impulse. However, increased percentages of metallic fuel necessarily result in lower percentages of hydrazine. Since hydrazine provides the major amount of propulsive gases, lowering the percentage of hydrazine tends to reduce specific impulse. The optimum compromise between these competing factors can be determined by calculations familiar to those skilled in the art.

The especially preferred compositions of this invention utilize finely-divided Be as the metallic fuel component since Be has the advantage of forming a highly stable oxide which does not decompose or vaporize to any substantial extent after its formation. This is advantageous because decomposition or vaporization of metal oxides absorb heat energy, thereby reducing the temperature and pressure of the thrust-producing gases.

The figure illustrates calculated specific impulses of compositions containing varying amounts of beryllium and having an oxidation ratio of 1. The high specific impulses produced by compositions of this invention are apparent from this graph, particularly within the range of 15% to 17% by weight Be.

The following are examples of compositions prepared according to this invention.

EXAMPLE 1

A gel of the following compositions was prepared:

| Ingredient: | Percent by weight |
|---|---|
| Hydrazine | 24.60 |
| Hydrazine nitrate | 57.50 |
| Beryllium | 16.4 |
| Jaguar A-20-B | 1.2 |
| Chromic oxide | 0.3 |

The fluid gel was loaded into a cylindrical container and burned under pressure.

The burning rate was about .85 in./sec. at 1000 p.s.i.a. A theoretical specific impulse of about 314 lb.-sec./lb. and a theoretical flame temperature of about 3264° K. were calculated for the composition.

EXAMPLE 2

A gel of the following compositions was prepared:

| Ingredient: | Percent by weight |
|---|---|
| Hydrazine | 24.20 |
| Hydrazine nitrate | 56.5 |
| Beryllium | 16.12 |
| Jaguar A-20-B | 1.18 |
| Chromic oxide | 2.0 |

Burning tests as described above were conducted. The composition burned at a rate of 1.05 in./sec. at 1000 p.s.i.a. A theoretical specific impulse of 312 lb.-sec./lb. and a theoretical flame temperature of 3230° K. were calculated for the composition.

EXAMPLE 3

A gel of the following composition was prepared:

| Ingredient: | Percent by weight |
|---|---|
| Hydrazine | 24.24 |
| Hydrazine nitrate | 56.24 |
| Berylium | 16.09 |
| Jaguar A-20-B | 0.98 |
| Chromic oxide | 0.49 |
| Carbowax 350 (a methoxy polyethylene glycol) | 1.96 |

The composition burned at a rate of 0.67 in./sec. at 1000 p.s.i.a. A theoretical specific impulse of 312 lb.-sec./lb. and a theoretical flame temperature of 3220° K. were calculated.

Many other compositions within the scope of this invention as defined in the appended claims, will be apparent to those skilled in the art.

I claim:

1. A heterogeneous propellant composition consisting essentially of hydrazine; hydrazine nitrate; finely-divided metallic fuel selected from the group consisting of beryllium, aluminum, magnesium, zirconium, hafnium, alloys of the aforesaid metals, hydrides of the aforesaid metals, and mixtures thereof; and a gelling agent capable of maintaining a stable hydrazine gel structure in the presence of hydrazine nitrate, said composition having an oxidation ratio of about .94 to about 1.50 as defined by the formula:

$$\text{Oxidation ratio} = \frac{O}{C + M\left(\frac{v}{2}\right)}$$

wherein O equals the total amount of oxygen in said composition; C equals the total amount of carbon; M equals the total amount of metal; and $v$ equals the valence of the metal, said O, C, and M being expressed in terms of the number of atomic equivalents, and wherein said metallic fuel is present in said composition in an amount at least sufficient to provide a flame temperature at least equal to the melting temperature of the metal oxide produced upon burning of said composition.

2. The composition of claim 1 wherein said composition has an oxidation ratio of about 0.98 to about 1.15.

3. The composition of claim 1 wherein said composition further contains a minor amount of a burning rate modifier.

4. The composition of claim 1 wherein said gelling agent is a galactomannan polysaccharide.

5. The composition of claim 1 wherein said gelling agent is a copolymer of methyl vinyl ether and maleic anhydride.

6. The composition of claim 1 wherein said metallic fuel is beryllium.

7. The composition of claim 6 wherein said composition contains from about 15% to about 17% beryllium by weight.

8. A propellant composition according to claim 7 wherein the gelling agent is a galactomannan polysaccharide and the composition contains a minor amount of a burning rate modifier.

9. The propellant composition of claim 8 wherein said burning rate modifier consists essentially of chromic oxide and a methoxy polyethylene glycol.

References Cited

UNITED STATES PATENTS

| 3,077,072 | 2/1963 | Rice | 60—219 |
| 3,164,505 | 1/1965 | Hsieh | 149—36 |
| 3,197,348 | 7/1965 | Skolnik et al. | 149—18 |
| 3,230,281 | 1/1966 | Carroz | 149—36 |

FOREIGN PATENTS

| 619,713 | 9/1961 | Canada | 149—36 |

BENJAMIN R. PADGETT, Primary Examiner

U.S. Cl. X.R.

149—18, 19, 20, 43